Nov. 4, 1952  W. H. WANNAMAKER, JR  2,616,296
TEMPERATURE MEASURING APPARATUS
Filed Oct. 1, 1949
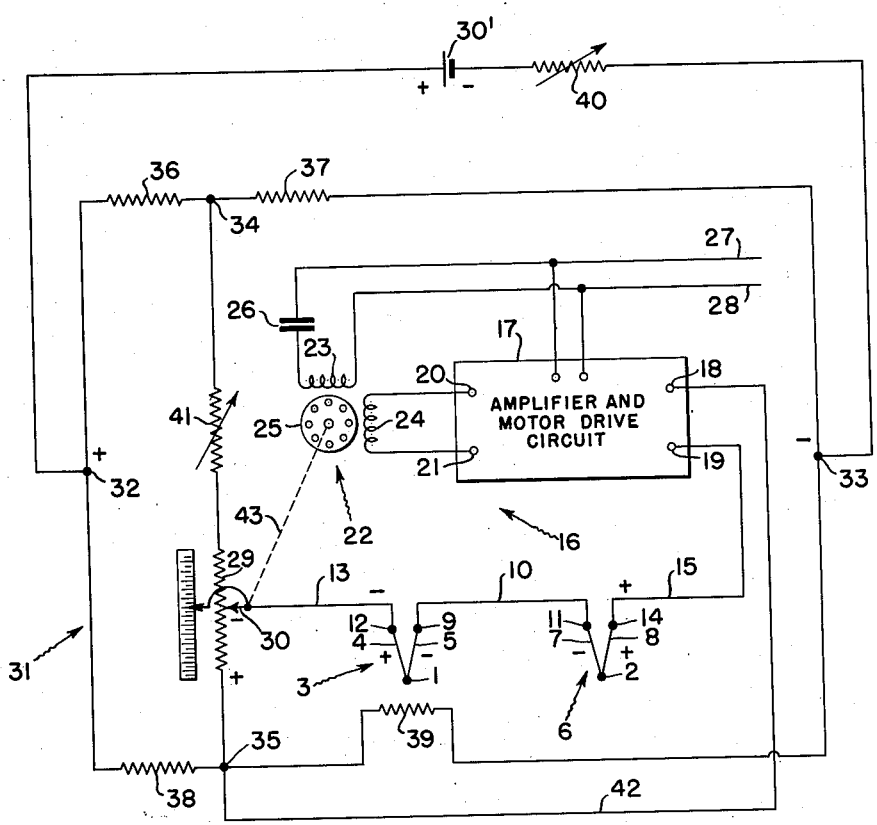
INVENTOR.
WILLIAM H. WANNAMAKER JR.
BY Arthur H. Swanson
ATTORNEY.

Patented Nov. 4, 1952

2,616,296

UNITED STATES PATENT OFFICE 2,616,296

TEMPERATURE MEASURING APPARATUS

William H. Wannamaker, Jr., Flourtown, Pa., assignor to Minneapolis-Honeywell Regulator Company, Minneapolis, Minn., a corporation of Delaware Application October 1, 1949, Serial No. 119,060

7 Claims. (Cl. 73—341)

The present invention broadly relates to electrical temperature measuring apparatus, and is specifically concerned with apparatus for the measurement of absolute temperature ratios by means of thermocouples.

The general object of the present invention is to provide an improved apparatus for electrically measuring absolute temperature ratios. A specific object of the invention is to provide an improved apparatus for utilizing thermoelectric elements or thermocouples in the measurement of the ratio of two temperatures.

A more specific object of the present invention is to provide apparatus for measuring the ratio of two temperatures by means of thermocouples, wherein an additional temperature sensitive element is employed for the purpose of modifying a voltage which varies in accordance with the difference between the two temperatures to obtain a measurement of the ratio of the two temperatures.

Absolute temperature ratio measuring apparatus of the type disclosed and claimed herein has utility in many diversified applications. For example, in the operation of large axial flow air compressors, it has been found essential to have a continuous indication of the absolute temperature ratio of the air inlet and outlet temperatures if the compressor is to be efficiently operated in a safe manner. That is, it has been found that when operating a large axial flow compressor under a varying load, the operation of the compressor may automatically shift to an unstable portion of its operating curve. Such a shift to an unstable operating condition creates a dangerous situation, since operation beyond the stall point is then likely to occur, causing serious damage or even destruction of the compressor due to the severe vibration of the compressor blades produced by such operation beyond the stall point.

Further, it has also been found that the absolute temperature ratio of the inlet and outlet air temperatures of such a compressor is a measure of the efficiency of the compressor operation, and that, for a given pressure ratio, an increasing absolute temperature ratio indicates a decreasing efficiency of operation and an approach to a stall point and its accompanying hazardous operation. By having available a constant measure of the absolute temperature ratio, however, a tendency to unstable operation of the compressor can be quickly noted, and remedial operating measures can then be taken to prevent damage to the apparatus.

The absolute-temperature-ratio measuring apparatus of the present invention is especially well suited for providing a continuous indication of the operating temperature ratio of a compressor for the purpose just described. For example, the high temperature of the outlet air of such a compressor dictates that a thermoelectric type of temperature sensitive element be employed for measuring this temperature. Accordingly the apparatus of the present invention, which employs thermoelectric elements for the temperature measurements, is extremely well adapted for this compressor application.

There are numerous other uses to which the absolute temperature ratio measuring apparatus of the present invention may advantageously be put. Among these are the measurement of temperature ratios for determining solution concentration in the sugar refining industry, the measurement of relative humidity at high ambient temperatures, and the measurement of the efficiencies of internal combustion engines and heat exchange apparatus.

Broadly, the novel temperature ratio measuring apparatus of the present invention performs its function by subjecting a first thermoelectric junction to one of the two temperatures whose ratio is to be measured, to derive a first voltage variable with that one temperature, subjecting a second thermoelectric junction to the other of said temperatures to derive a second voltage variable with said other temperature, deriving a voltage which is the difference of said first and second voltages, establishing a variable reference voltage, varying said reference voltage in direct proportion to one of said temperatures, and comparing said difference voltage and said varied reference voltage to obtain a measure of the ratio of the said two temperatures.

In the novel arrangement disclosed in the present application as a preferred form of apparatus of the present invention, a self-balancing null type of voltage responsive measuring device is employed for providing the desired ratio measurement. In the disclosed apparatus, the difference voltage obtained from the two series-connected thermoelectric junctions is automatically balanced against an opposing reference voltage obtained across a portion of a slide wire resistor. In addition, the total reference voltage across this slide wire resistor is caused to vary in direct proportion to one of the temperatures under consideration. This variation in the reference voltage is preferably produced by means of a resistance thermometer type of temperature sensitive element which is connected in the circuit supplying the reference voltage to the slide wire resistor.

Associated with the slide wire resistor is an adjustable contact which is automatically positioned by a reversible electric motor included in the voltage responsive device. The latter is continuously operative to cause this contact to be positioned at any given time at a point on the slide wire resistor at which the portion of the reference voltage between the contact and an end of the resistor is equal and opposite to the thermoelectric difference voltage at that time. Since the reference voltage is also directly proportional to one of the temperatures in question, the position of the contact along the slide wire resistor is made to be a measure of the ratio of the two temperatures.

In addition to the above, inasmuch as only the two temperatures whose ratio is to be measured are involved in producing the thermoelectric difference voltage, the ratio which is measured by the disclosed apparatus is that of the absolute values of the two temperatures.

The various features of novelty which characterize my invention are pointed out with particularity in the claims annexed to and forming a part of this specification. For a better understanding of the invention, however, its advantages and specific objects attained with its use, reference should be had to the accompanying drawing and descriptive matter in which I have illustrated and described a preferred embodiment of the invention.

Of the drawings the single figure is a modified schematic electrical circuit diagram of a preferred form of the temperature ratio measuring apparatus of the present invention.

The preferred embodiment of the present invention illustrated in the drawing comprises a first thermoelectric junction 1, adapted to be subjected to a first temperature, and a second thermoelectric junction 2, adapted to be subjected to a second temperature. The measuring apparatus including the thermoelectric junctions 1 and 2 is designed to measure the ratio of the absolute values of the two temperatures just specified.

The thermoelectric junction 1 is shown as being a portion of a thermocouple 3 and is the junction formed between two thermocouple wires 4 and 5, of dissimilar metals. Similarly, the thermoelectric junction 2 is shown as a portion of a thermocouple 6 having elements 7 and 8 of dissimilar metals which are joined to form the junction 2. Although various metals may be utilized for the thermocouple wires 4, 5, 7, and 8, these metals must be so chosen that the difference voltage obtained when the thermocouples 3 and 6 are connected in series opposition is a measure of the difference between the two temperatures to which the junctions 1 and 2 are respectively exposed.

By way of example, it may be noted that in a successfully operating model of the apparatus being discussed, the thermocouples 3 and 6 were iron-Constantan couples. For purposes of illustration, the following description of the disclosed apparatus will refer to the thermocouples 3 and 6 as being of the iron-Constantan type. It should be understood, however, that other thermocouple materials or other types of thermocouples may be employed if desired.

In the apparatus under discussion, the wires 5 and 7 of the thermocouples are the Constantan wires thereof. The end of the wire 5 remote from the junction 1 is connected at a junction 9 to one end of a Constantan lead wire 10, the remaining end of which is connected at a junction 11 to the end of the Constantan thermocouple wire 7 remote from the junction 2. Since each of the wires 5, 7, and 10 is of Constantan, the junctions 9 and 11 are not thermoelectric junctions but merely serve as electrical connections for the associated wires.

The iron wire 4 of the thermocouple 3 is connected at a junction 12 to one end of a copper conductor 13. Similarly, the iron wire 8 of the thermocouple 6 is connected at a junction 14 to one end of a copper conductor 15. Since the thermoelectric difference between iron and copper can be considered to be negligible, it is apparent that the junctions 12 and 14 serve no thermoelectric purpose, but merely connect electrically the associated wires.

From the foregoing description of the connections to the thermocouples 3 and 6, it should be apparent that the electrical outputs of the junctions 1 and 2 are connected in series opposition, and hence that the net voltage produced between the conductors 13 and 15 by the junctions 1 and 2 will be a difference voltage which will vary directly in accordance with the difference between the temperatures to which the junctions 1 and 2 are subjected.

The difference voltage produced between the conductors 13 and 15 is compared with an adjustable reference voltage for the purpose of determining the ratio between the absolute temperatures in the vicinities of the junctions 1 and 2. To this end, there is provided a voltage responsive device 16 having an amplifying and motor controlling portion 17 provided with a pair of input terminals 18 and 19. The thermoelectric junctions 1 and 2 and the adjustable reference voltage are connected in series between the input terminals 18 and 19 in the input portion of the voltage responsive device 16 in a manner shortly to be described.

By way of illustration, the voltage responsive device 16 of the disclosed apparatus has been diagrammatically shown as being of the electronic conversion and motor drive type as disclosed in the Wills Patent 2,423,540. For purposes of simplification, the electronic conversion amplifier and motor drive circuit of said Wills patent has been shown in block form as the portion 17 of the subject apparatus. Since this electronic conversion and motor drive apparatus and its operation are explained in detail in said Wills patent, it appears necessary only to state herein that a D. C. voltage applied between the input terminals 18 and 19 will be converted by the apparatus into a corresponding alternating current voltage which in turn is amplified and utilized by the apparatus in producing a motor controlling voltage which will appear between a pair of output terminals 20 and 21 of the portion 17.

Associated with the control portion 17 of the voltage responsive device 16 is a reversible electric motor 22 having a power winding 23, a control winding 24, and a rotor 25. The winding 23 is connected in series with a condenser 26 between alternating current supply conductors 27 and 28 which are operative to supply to the winding 23 a substantially constant voltage of conventional magnitude and frequency. The apparatus portion 17 is also supplied with energizing voltage from the conductors 27 and 28 as shown. The motor control winding 24, however, is connected between the output terminals 20 and 21 of the apparatus portion 17 and is therefore energized by the motor controlling voltage produced between these terminals. In view of the complete disclosure presented in the aforementioned Wills patent, it is necessary herein only to state that the motor control voltage produced by the apparatus portion 17 causes the motor control winding 24 to cooperate with the power winding 23 so as to cause rotation of the rotor 25 in a direction corresponding to the polarity of the voltage applied between the apparatus input terminals 18 and 19, and at a speed which is determined by the magnitude of that voltage.

For the purpose of establishing the aforementioned variable reference voltage in the subject apparatus, there is provided a slide wire resistor 29 associated with which is an adjustable sliding contact 30. The slide wire resistor 29 is supplied with a variable energizing voltage from a suitable battery 30' by means of a Wheatstone bridge circuit generally designated at 31.

The bridge circuit 31 includes input terminals 32 and 33, output terminals 34 and 35, non-temperature sensitive resistors 36, 37, and 38, and a temperature sensitive resistor 39. These elements of the bridge circuit 31 are connected in the following manner. The resistor 36 is connected between the input terminal 32 and the output terminal 34, while the resistor 37 is connected between the output terminal 34 and the input terminal 33. The resistor 38 is connected between the input terminal 32 and the output terminal 35, while the temperature sensitive resistor 39 is connected between the output terminal 35 and the input terminal 33. The battery 30' is connected in series with an adjustable resistor 40 between the bridge circuit input terminals 32 and 33.

The bridge circuit output terminals 34 and 35 are utilized as the energizing terminals for the slide wire resistor 29. To this end, the resistor 29 is connected in series with an adjustable resistor 41 between the terminals 34 and 35.

The aforementioned variable reference voltage with which the thermocouple difference voltage is compared in the input portion of the device 16 is obtained from the slide wire resistor 29 between the adjustable contact 30 thereof and the terminal 35. Accordingly, the contact 30 and terminal 35 constitute a pair of output terminals for the slide wire resistor 29 between which there is produced a variable reference voltage of a magnitude jointly dependent upon the magnitude of the energizing voltage applied to the slide wire 29 between the terminals 34 and 35 at the output of the bridge circuit 31, and upon the position of the contact 30 relative to the end of the resistor 29 adjacent the terminal 35.

The variable reference voltage appearing between the contact 30 and the terminal 35 as just described is arranged to oppose the thermocouple difference voltage in the input portion of the voltage responsive device 16. To this end, the aforementioned conductor 13 is connected to the slide wire resistor contact 30, while the conductor 15 is connected to the input terminal 19 of the device 16. The remaining input terminal 18 of the latter is connected by a conductor 42 to the remaining reference voltage terminal 35.

In order that the variable reference voltage will oppose the thermocouple difference voltage in the input of the device 16, the battery 30' is so connected to the bridge circuit 31 that the bridge circuit input terminal 32 is rendered positive with respect to the terminal 33. The relative resistance values of the bridge circuit resistors 36, 37, 38, and 39 are then so chosen in a known manner that the bridge circuit output voltage between the terminals 34 and 35 causes the terminal 35 to be positive with respect to the terminal 34. As a result of this, the reference voltage appearing between the contact 30 and the terminal 35 will always be such as to render the contact 30 negative with respect to the terminal 35. Finally, the thermoelectric junction 1 is arranged to be subjected to the lower of the two temperatures whose ratio is to be measured, whereby any difference between those temperatures will render the conductor 15 positive with respect to the conductor 13 by an amount which is directly variable in accordance with the temperature difference.

If the circuit connected between the input terminals 18 and 19 external to the device 16 is traced, it will be seen that the voltages therein are of the proper relative polarity to produce the required voltage opposition. Specifically, said external circuit can be traced from the input terminal 18 and through the conductor 42 to the positive reference voltage terminal 35. From this terminal the circuit passes through a portion of the slide wire resistor 29 to the contact 30, which is negative with respect to the terminal 35. Connected to the terminal 30 is the negative thermocouple conductor 13, and between the conductor 13 and the positive conductor 15 are connected in series voltage opposition the thermoelectric junctions 1 and 2. Finally, the conductor 15 is connected to the remaining input terminal 19.

It can readily be seen from the drawing that when the junction 1 is subjected to the lower of the two temperatures under measurement, the conductor 13 will always be negative with respect to the conductor 15, since under this condition, the junction 2, which has its positive wire 8 connected to the conductor 15 and has its negative wire 7 connected to the conductor 13, will produce a greater voltage between the connections 11 and 14 than will be produced by the junction 1 between the connections 9 and 12.

The voltage responsive device 16 including the motor 22 is operative to maintain the reference voltage between the contact 30 and the terminal 35 equal and opposite at all times to the thermocouple difference voltage appearing between the conductors 13 and 15. To this end, a mechanical linkage 43 is connected between the motor rotor 25 and the contact 30 so that as the rotor 25 rotates, the contact 30 is correspondingly adjusted along the length of the slide wire resistor 29. Accordingly, when the contact 30 is at a position along the slide wire resistor 29 such that the reference voltage is equal in magnitude to the thermocouple difference voltage, no voltage is applied between the input terminals 18 and 19, and the corresponding motor control signal then produced by the portion 17 is effective to prevent motion of the rotor 25 or contact 30. In this condition, the apparatus is said to be in balance.

Upon a change in the magnitude of the thermocouple difference voltage, however, this voltage will no longer be equally opposed by the reference voltage, and a net voltage will then appear between the input terminals 18 and 19. This last mentioned voltage will have a magnitude dependent upon the difference between the reference voltage and the thermocouple difference voltage, and will have a polarity dependent upon which of the two last mentioned voltages is the greater. Under this condition, the apparatus portion 17 will be operative to produce an appropriate motor control voltage which, in turn, will cause rotation of the rotor 25 in the direction and to the extent necessary to move the slide wire resistor contact 30 to a new position along the resistor 29 at which the balanced condition of the apparatus will be restored, and no voltage will be applied between the input terminals 18 and 19.

In the foregoing description, no account has been taken of the fact that the bridge circuit resistor 39 is temperature sensitive. If it is assumed for the moment that resistor 39 is not temperature sensitive, it can readily be seen that for a constant energizing voltage applied between the bridge circuit input terminals 32 and 33, the voltage between the slide wire resistor energizing terminals 34 and 35 will be constant at all times. If this were the case, the voltage responsive device 16 would be operative to position the adjustable contact 30 along the slide wire resistor 29 solely in accordance with the difference voltage of the thermoelectric junctions 1 and 2. Under this condition, the position of the contact 30 relative to the lower, positive end of the resistor 29 would then be a measure of the difference, but not the ratio, of the two temperatures to which the junctions 1 and 2 are respectively subjected.

In the ratio measuring apparatus of the present invention, however, the energizing voltage for the slide wire resistor 29 produced between the terminals 34 and 35 is not maintained at a constant value at all times. Instead, this voltage is made to vary in direct proportion to one of the two temperatures under consideration. In order to accomplish this, the bridge circuit resistor 39 is made a temperature sensitive resistor as noted hereinbefore, and is positioned closely adjacent to the thermoelectric junction 1 so as to be subjected to substantially the same temperature as the junction 1. From a consideration of the illustrated bridge circuit 31, it is obvious that for a constant energizing voltage applied between the terminals 32 and 33, the bridge circuit output voltage, which is the energizing voltage for the slide wire resistor 29, will vary in direct proportion to the resistance value of the resistor 39. Since the resistor 39 is chosen so as to exhibit a suitable relationship between its resistance and the temperature to which it is subjected, the voltage between the terminals 34 and 35, and hence the reference voltage between the contact 30 and the terminal 35, are caused to vary in direct proportion to the temperature to which the junction 1 is subjected.

The effect of so varying the reference voltage in accordance with one of the two temperatures being measured is to cause the contact 30 to be positioned along the resistor 29 in accordance with the ratio of the two measured temperatures, rather than in accordance with the difference between these temperatures. To illustrate this, let it be assumed that the two temperatures under consideration are equal at some given time. Under this condition, the difference voltage between the conductors 13 and 15 will be equal to zero, and the device 16 will position the contact 30 at the extreme positive end of the resistor 29, since this is the only point along the last mentioned resistor at which zero reference voltage can be obtained. That this will occur can readily be seen when it is noted that for a difference voltage of zero, a reference voltage of zero value is the only one which will produce a zero input voltage to the device 16 and produce a balanced condition of the apparatus.

It is obvious that a difference voltage of zero indicates equality between the two temperatures to which the junctions 1 and 2 are respectively subjected. Therefore, a zero difference voltage represents a temperature ratio of 1. Consequently, the position of the contact 30 at the extreme positive end of the slide wire resistor 29 can be calibrated as the point representing the measured absolute temperature ratio of 1. That the contact 30 will assume this position for any condition of equality between the two measured temperatures, no matter what the absolute value of the temperature, is readily seen from the fact that no matter what the resistance of resistor 39, and hence no matter what the magnitude of the voltage between the terminals 34 and 35, the point at the extreme positive end of the resistor 29 will be the only point at which the reference voltage determined by the position of the contact 30 will be zero.

As a further illustration of the operation of the present invention, let it be assumed that the thermoelectric junction 1 and temperature sensitive resistor 39 are subjected to a temperature of 800° F. Let it also be assumed that the temperature to which the junction 2 is subjected is 1600° F. Under this condition, the temperature difference as exemplified by the difference voltage between the conductors 13 and 15 will be 800° F. and the contact 30 will be positioned at a point which can be calibrated to indicate the existing absolute temperature ratio of 2. The voltage between the terminals 34 and 35 and hence the reference voltage between the contact 30 and terminal 35 will have fixed values corresponding to the temperature of 800° F. to which the resistor 39 is subjected.

If it is now assumed that the temperature to which the junction 1 and resistor 39 are subjected increases from 800° F. to 1200° F., and at the same time the temperature to which the junction 2 is subjected increases from 1600° F. to 2000° F., the difference voltage between the conductors 13 and 15 will remain the same, since the measured temperature difference is still 800° F. Were it not for the operation of the resistor 39, the contact 30 would remain in the last mentioned position representing a temperature difference of 800° F. and a temperature ratio of 2, since the reference voltage would not have changed with the temperature, and since the difference voltage would remain the same. However, the ratio indication provided by the apparatus would then be in serious error, since the new ratio of the temperatures is no longer 2, but has been reduced to 1.67.

The resistor 39 of the present invention is operative, however, to prevent such errors in the ratio measurements made by the apparatus. In the above illustrative example, when the temperature at the junction 1 and resistor 39 changes from 800° F. to 1200° F., the resistance of the resistor 39 will increase correspondingly, and hence the voltage between the terminals 34 and 35 will be increased an amount directly proportional to the temperature increase at the resistor 39. This, in turn, will cause an increase in the reference voltage between the contact 30 and the terminal 35, even though the contact 30 remains momentarily at the point indicating a temperature ratio of 2 and a temperature difference of 800° F.

When this occurs it can easily be seen that the apparatus will no longer be in balance, since the reference voltage will have increased while the difference voltage will have remained unchanged. Accordingly, an input voltage will be produced between the terminals 18 and 19 having a polarity such that the motor 22 will adjust the contact 30 to a new position closer to the positive end of the resistor 29, at which position the reference voltage will again just oppose the difference voltage and the apparatus will once more be in balance. In moving to its new position, the contact 30 will have left the point indicating a ratio of 2 and will have moved toward the point indicating a ratio of 1. The new point at which the device 16 will position the contact 30 can then be calibrated to indicate the existing temperature ratio of 1.67.

From the above description it should be evident that the apparatus of the present invention is operative to provide an indication of the ratio of two measured temperatures by first ascertaining a difference voltage which is a function of the difference of the two temperatures, and then by comparing this difference voltage with a reference voltage which has been varied in accordance with one of the two measured temperatures.

In the use of the measuring apparatus of the present invention, it will be found necessary to maintain the bridge circuit energizing voltage, applied between the terminals 32 and 33, constant despite changes in the voltage supplied by the battery 30'. To this end, the variable resistor 40 connected in series with the battery 30' is provided as a means for adjusting the bridge circuit energizing voltage in order to maintain the latter constant. If desired, the resistor 40 may be automatically adjusted to maintain constant the bridge circuit energizing voltage as is done and explained in the aforementioned Wills patent.

The adjustable resistor 41 is provided in the present invention in series with the slide wire resistor 29 for the purpose of permitting initial calibration of the apparatus. After the apparatus is calibrated, no further adjustments need be given to the resistor 41 unless the length of the conductors connected to the resistor 39 is changed substantially.

It is believed to be apparent that the two thermocouples 3 and 6 of the disclosed embodiment of the present invention could, if desired, be replaced by a single thermocouple formed of suitable materials. For example, a single copper-Constantan thermocouple could be connected between the conductors 13 and 15 at the junctions 12 and 14 in lieu of the thermocouples 3 and 6. If this were done, with the copper wire of the new thermocouple connected to the copper conductor 13 at the junction 12, this junction would not be thermoelectric. The copper-Constantan junction of the thermocouple would then be a thermoelectric junction which would be subjected to the first temperature to be measured in lieu of the junction 1. Finally, the Constantan wire of the thermocouple would be connected to the junction 14, and this junction would form a second thermoelectric junction which would replace the junction 2 subjected to the second of the two measured temperatures.

By way of example and illustration, and not by way of limitation, the following is a list of the component values for the various elements of the aforementioned operating model constructed in accordance with the present invention:

Resistor 29, 200 ohm slide wire
Resistor 36, 32.6 ohms
Resistor 37, 565 ohms
Resistor 38, 14.2 ohms
Resistor 39, Brown Instrument Co. type "A" nickel resistance thermometer bulb; 507.5 ohms @ 32° F.
Resistor 40, 200 ohm adjustable
Resistor 41, 100 ohm adjustable
Battery 30, 1.5 volts (average)
Thermocouple wires 4 and 8, iron
Thermocouple wires 5, 7, and 10, Constantan While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. An absolute temperature ratio measuring device comprising a first thermoelectric junction adapted to be subjected to a first temperature, a second thermoelectric junction adapted to be subjected to a second temperature, adjustable reference voltage means having energizing terminals adapted to be connected to a source of energizing voltage and having a pair of output terminals between which said reference voltage means is operative, when energized from the source, to provide a voltage of a magnitude jointly dependent upon the magnitude of the voltage applied between said energizing terminals and the adjustment of said means, a temperature sensitive element connected in the energizing connection to said energizing terminals of said reference voltage means, adapted to be subjected to one of said first and second temperatures, and operative to increase the voltage applied between said energizing terminals upon an increase in said one of said temperatures, a voltage responsive device having a pair of input terminals, and conductor means connecting said first and second thermoelectric junctions in series voltage opposition and in series with said output terminals between said input terminals, said voltage responsive device including adjusting means connected to said adjustable reference voltage means and operative to adjust the latter in accordance with the magnitude and polarity of the resultant voltage applied between said input terminals, whereby said adjusting means adjusts said adjustable reference voltage means in accordance with the ratio of said first and second temperatures.

2. Apparatus as specified in claim 1, wherein said adjustable reference voltage means is a slide wire resistor having its end terminals connected between said energizing terminals and having an adjustable contact electrically connected to one of said output terminals, the other of said output terminals being connected to one of said energizing terminals, and wherein said contact is mechanically linked to said adjusting means of said voltage responsive device, whereby the latter is operative to adjust said contact along said slide wire resistor in accordance with the ratio of said first and second temperatures.

3. An absolute temperature ratio measuring device comprising a first thermoelectric junction adapted to be subjected to a first temperature, a second thermoelectric junction adapted to be subjected to a second temperature, a Wheatstone bridge circuit having a pair of input terminals, a pair of output terminals, and four bridge arms including resistance elements connected between said terminals, one of said elements being temperature sensitive and adapted to be subjected to one of said first and second temperatures, conductors adapted to connect said input terminals to a source of energizing voltage, said bridge circuit being operative, when so energized, to provide between said output terminals a voltage of a magnitude dependent upon the resistance of said one element and which increases when said one of said temperatures increases, adjustable reference voltage means having a pair of energizing terminals and a pair of output terminals, conductors connecting each of said energizing terminals to a respective one of said bridge circuit output terminals, said reference voltage means being operative, when so connected, to provide between the output terminals thereof a voltage of a magnitude jointly dependent upon the resistance of said one element and the adjustment of said means, a voltage responsive device having a pair of measuring terminals, and conductors connecting said first and second thermoelectric junctions in series voltage opposition and in series with the output terminals of said reference voltage means between said measuring terminals, said voltage responsive device including adjusting means connected to said adjustable reference voltage means and operative to adjust the latter in accordance with the magnitude and polarity of the resultant voltage applied between said measuring terminals, whereby said adjusting means adjusts said adjustable reference voltage means in accordance with the ratio of said first and second temperatures.

4. Apparatus as specified in claim 3, wherein said adjustable reference voltage means is a slide wire resistor having its end terminals connected between said bridge circuit output terminals and having an adjustable contact electrically connected to one of the output terminals of said reference voltage means, the other of the last mentioned terminals being connected to one of said bridge circuit output terminals, and wherein said contact is mechanically linked to said adjusting means of said voltage responsive device, whereby the latter is operative to adjust said contact along said slide wire resistor in accordance with the ratio of said first and second temperatures.

5. Apparatus as specified in claim 1, wherein said first thermoelectric junction is the hot junction of a first thermocouple, wherein said second thermoelectric junction is the hot junction of a second thermocouple composed of the same materials as said first thermocouple, each of said thermocouples consisting of a positive wire and a negative wire jointed to form the corresponding hot junction, and wherein one of the wires of said first thermocouple is connected to one of said output terminals, the other of the wires of said first thermocouple is connected to the wire of identical polarity of said second thermocouple, the other wire of said second thermocouple is connected to one of said input terminals, and the other of said output terminals is connected to the other of said input terminals, said hot junctions being the only significantly thermoelectric junctions in the apparatus.

6. Apparatus as specified in claim 1, wherein said voltage responsive device comprises an electronic conversion amplifier having an output portion and an input portion connected between said input terminals, a reversible electric motor having a rotor and energizing terminals, a motor drive circuit having output terminals connected to said motor energizing terminals, having input terminals connected to the output portion of said amplifier, and operative to control the speed and direction of rotation of said rotor in respective accordance with the magnitude and polarity of the resultant voltage applied between the first mentioned input terminals, and a mechanical linkage connected between said motor rotor and said adjustable reference voltage means and operative to adjust the latter in accordance with the magnitude and polarity of said resultant voltage.

7. An absolute temperature ratio measuring device comprising a first thermocouple having a positive wire and a negative wire joined to form a first hot thermoelectric junction adapted to be subjected to a first temperature, a second thermocouple composed of the same materials as said first thermocouple and having a positive wire and a negative wire joined to form a second hot thermoelectric junction adapted to be subjected to a second temperature, a Wheatstone bridge circuit having a pair of input terminals, a pair of output terminals, and four bridge arms including resistance elements connected between said terminals, one of said elements exhibiting a positive temperature coefficient of resistance and adapted to be subjected to one of said first and second temperatures, conductors adapted to connect said input terminals to a source of energizing voltage, said bridge circuit being operative, when so energized, to provide between said output terminals a voltage of a magnitude directly dependent upon said one of said temperatures, a slide wire resistor having its end terminals connected between said output terminals and having an adjustable contact, said slide wire resistor being operative, when so connected, to provide between said contact and one of said end terminals a reference voltage of a magnitude jointly dependent upon said one of said temperatures and the position of said contact along said slide wire resistor, an electronic conversion amplifier having an output portion and an input portion including a pair of measuring terminals, a connection between one of the wires of said first thermocouple and said contact, a connection between the other of said wires of said first thermocouple and the wire of identical polarity of said second thermocouple, a connection between the other wire of said second thermocouple and one of said measuring terminals, a connection between said one of said end terminals of said slide wire resistor and the other of said measuring terminals, said hot junctions being the only significantly thermoelectric junctions in said apparatus, whereby the aforementioned connections are operative to apply between said measuring terminals a resultant voltage dependent in magnitude upon the difference between the reference voltage between said contact and said one end terminal and a difference voltage varying in accordance with the difference between said first and second temperatures, and dependent in polarity upon the relative magnitudes of said difference voltage and said reference voltage, a reversible electric motor having a rotor and energizing terminals, a motor drive circuit having output terminals connected to said motor energizing terminals, having input terminals connected to the output portion of said amplifier, and operative to control the speed and direction of rotation of said rotor in respective accordance with the magnitude and polarity of the resultant voltage applied between said measuring terminals, and a mechanical linkage connected between said motor rotor and said contact and operative to cause said motor to adjust said contact to positions along said slide wire resistor corresponding to the ratio of said first and second temperatures.

WILLIAM H. WANNAMAKER, JR.

REFERENCES CITED

The following references are of record in the file of this patent:

UNITED STATES PATENTS

| Number | Name | Date |
| --- | --- | --- |
| 1,617,416 | Pierce | Feb. 15, 1927 |
| 2,501,377 | Cherry | Mar. 21, 1950 |